US008967083B2

(12) United States Patent
Hoey (10) Patent No.: US 8,967,083 B2
(45) Date of Patent: Mar. 3, 2015

(54) SYSTEM AND METHOD OF SUB CLINICAL DETECTING MASTITIS

(71) Applicant: Michael Hoey, Shoreview, MN (US)

(72) Inventor: Michael Hoey, Shoreview, MN (US)

( * ) Notice: Subject to any disclaimer, the term of this patent is extended or adjusted under 35 U.S.C. 154(b) by 0 days.

(21) Appl. No.: 13/646,913

(22) Filed: Oct. 8, 2012

(65) Prior Publication Data

US 2013/0087468 A1    Apr. 11, 2013

Related U.S. Application Data

(60) Provisional application No. 61/545,350, filed on Oct. 10, 2011.

(51) Int. Cl.
*A01J 5/013* (2006.01)
*A01J 5/007* (2006.01)

(52) U.S. Cl.
CPC ............... *A01J 5/0133* (2013.01); *A01J 5/007* (2013.01)
USPC .................... 119/14.14; 422/82.01

(58) Field of Classification Search
USPC ........... 204/400; 205/775; 119/14.01, 14.02, 119/14.08, 14.14, 14.54; 422/82.01, 82.03
See application file for complete search history.

(56) References Cited

U.S. PATENT DOCUMENTS

| | | | | |
|---|---|---|---|---|
| 5,502,492 | A | * | 3/1996 | Jung ........................ 375/240.14 |
| 5,692,020 | A | * | 11/1997 | Robbins ........................ 375/350 |
| 5,829,381 | A | * | 11/1998 | Nijkamp et al. ........... 119/14.55 |
| 2010/0071626 | A1 | * | 3/2010 | Hoey ......................... 119/14.02 |

OTHER PUBLICATIONS

Cristina Garcia-Alijaro et al., "On-chip impedimetric detection of bacteriophages in dairy samples," Biosensors and Bioelectronics 24 (2009) 1712-1716.*
Das et al., "Performance study of a 'constant phase angle based' impedance sensor to detect milk adulteration," Sensors and Actuators A: Physical 167 (2011) 273-278 (available online Mar. 16, 2011).*
Tinsky et al. "Early Detection of Clinical and Sub-Clinical Mastitis Using an On-line Electrical Conductivity Device in the Parlor," in Proceedings of the IDF International Mastitis Seminar; 2; S-7, 13-S-7, 14 3rd International mastitis seminar, 1995.*
Stephen Gorard "Revisiting a 90-year-old debate: the advantages of the mean deviation," Paper presented at the British Educational Research Association Annual Conference, University of Manchester, Sep. 16-18, 2004.*
Falie et al. "New Algorithms of the Absolute Deviation Covariance and Correlation," published in 2010 8th International Conference on Communications (COMM) IEEE held Jun. 10-12, 2010.*

* cited by examiner

*Primary Examiner* — Alex Noguerola
(74) *Attorney, Agent, or Firm* — Beck & Tysver PLLC (57) ABSTRACT

Mastitis in a milking animal is detected through sensing the capacitance effects in milk. Using frequencies of greater than 60 megahertz applied by a capacitance probe to milk as it streams through otherwise conventional milking equipment during milking, yields a reliably discernable shift in the phase angle, indicating the presence of mastitis.

5 Claims, 9 Drawing Sheets

SYSTEM AND METHOD OF SUB CLINICAL DETECTING MASTITIS

CROSS REFERENCE

The present application is the Utility application conversion of Provisional Application 61/545,350, filed Oct. 10, 2011.

FIELD OF THE INVENTION

The present invention relates generally to a system and method for detecting disease in a mammal and more particularly to a system and method for detecting mastitis in a dairy cow.

BACKGROUND OF THE INVENTION

One of the most common and costly challenges in the dairy industry is mastitis, an inflammatory reaction of udder tissue due to bacterial, chemical, thermal or mechanical injury. Mastitis adversely affect milk production, milk quality, retail shelf life and increases costs to the farmer in treatment and lost production. It is estimated that mastitis costs the U.S. dairy industry $2 billion per year.

Mastitis may be infectious, i.e. caused by microbial organisms, or noninfectious, resulting from physical injury to the mammary gland. The inflammatory response yields changes in the composition of milk. For example, somatic cell count is increased in mastitis milk.

Severity of mastitis is typically characterized in two stages: sub-clinical mastitis and clinical. Sub-clinical mastitis is characterized by somatic cell counts in the range of 250,000-300,000 per milliliter; clinical mastitis has somatic cell counts in excess of 300,000 per milliliter. High somatic cell count causes a rise in whey protein and a decrease in casein resulting in a considerably lower cheese yields. A shorter shelf life and unpleasant milk flavors result from high somatic cell counts. Higher somatic cell counts are also associated with decreased volume production. Mastitis often begins in one of a cow's teats and, if untreated, typically progresses to one or more of the other teats.

Mastitis typically goes unnoticed until it is rather severe. This is especially the case in dairies that use robotic equipment and methods to milk. Pre-clinical mastitis is generally not detectable by observation.

A variety of technology has been proposed and/or employed to identify mastitis cows or milk. U.S. Pat. Nos. 6,793,624 and 6,348,251 describes the use of near infrared spectroscopy by which milk is subjected to infrared light and a resulting spectral signature is analyzed and compared to the signature for healthy milk. U.S. Ser. No. 11/811,783 describes placing NIR sensors in-line within milking equipment.

U.S. Pat. No. 5,829,381 describes a device for measuring the complex impedance, such as electrical conductance or capacitance, of milk. It does not, however, explore or describe the parameters or a system or process that optimize the use of capacitance as an indicator of mastitis.

SUMMARY OF THE INVENTION

What has been needed is a system and method for recognizing a disease condition in a lactating mammal by examining or interrogating its milk. What has further been needed is such a system and method that is integrated with the equipment used to milk the mammal. Still further, what has been needed is a system and method for testing through the ordinary course of milking providing results in real-time or near real-time. What has further been needed is a system and device and method that detects pre-clinical mastitis as well as clinical mastitis. In addition, what has been needed is a method and device for detecting mastitis in a single quarter before it has spread to additional quarters in an udder.

BRIEF DESCRIPTION OF THE DRAWINGS

An exemplary version of a system, device and method for detecting disease in a milking mammal is shown in the figures wherein like reference numerals refer to equivalent structure throughout, and wherein:

FIG. 4c is a side perspective view of the cup of FIG. 4a;

FIG. 5a is a perspective view of a member that holds capacitance probe of FIG. 4a;

FIG. 5b is a side view of the member of FIG. 5a;

DETAILED DESCRIPTION OF PREFERRED EMBODIMENT(S)

The electrical response of milk in whole is affected by components or constituents within the milk. The amounts or ratios of these components change as mastitis develops. By observing the characteristics of an electrical circuit passing through milk, it is possible to sense the changed composition and hence presence of a mastitic infection.

Figure 1:
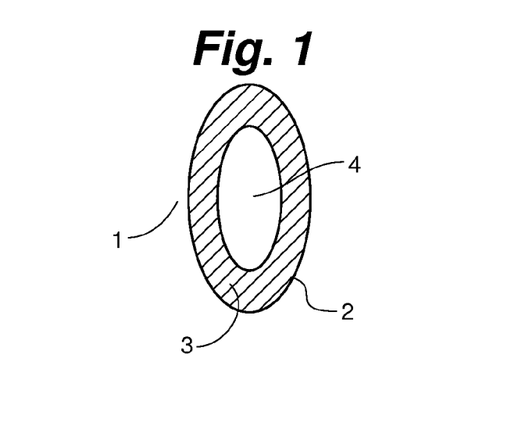
FIG. 1 is a schematic diagram of a cell.

More specifically, when electrical current passes through milk, the milk impedes the flow of electrons and therefore operates as a capacitive element in an electrical circuit. As illustrated in FIG. 1, at the cellular level, milk includes extracellular fluid 1 in which is suspended cells 2 defined by lipid membranes 3. Inside the lipid membrane 3 is intracellular fluid 4. The extra- and intra-cellular fluids are electrical conductors, while the lipid membrane is an electrical insulator.

When mastitis begins to develop, the mammary gland has an inflammatory response yielding an increase in immune cells (and eventually blood cells, when mastitis becomes more severe) within the milk. The capacitance of immune and blood cells is higher than the capacitance of healthy milk, and therefore an increase in immune cells (or blood) within the milk increases the capacitance of the infected milk. The more severe the infection the greater the effect on the milk's capacitance.

Figure 2:
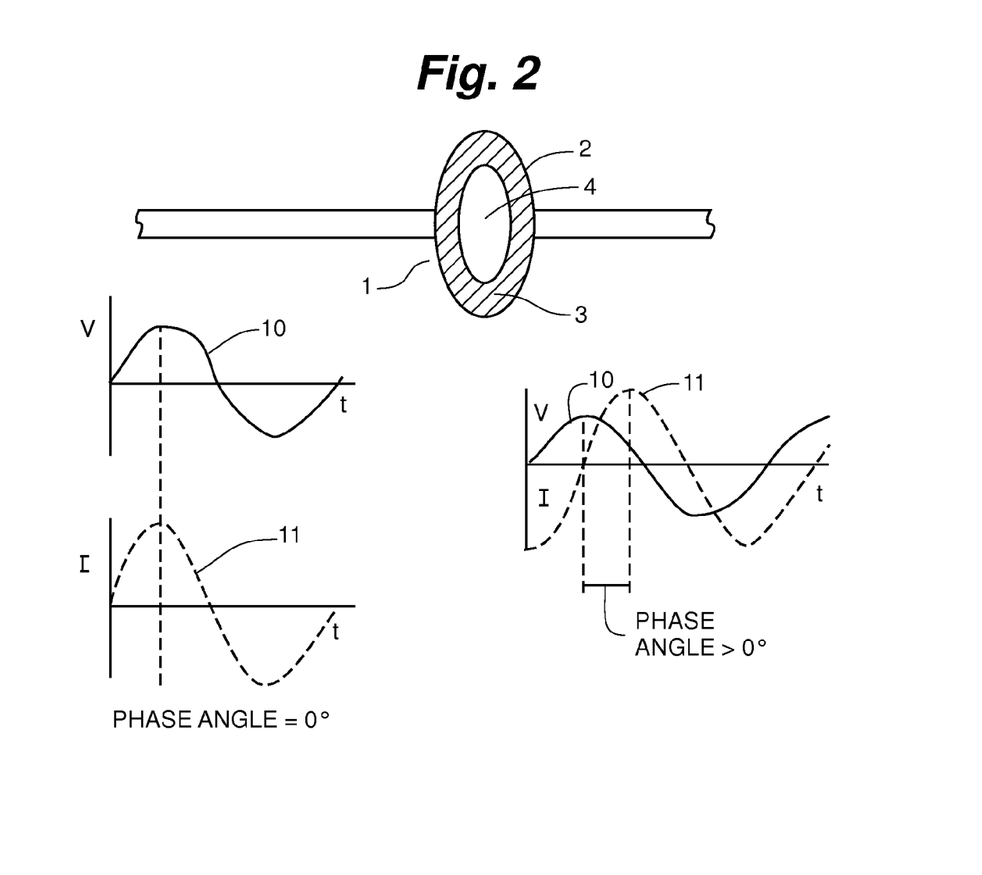
FIG. 2 is a schematic diagram of a cell in an electrical circuit with diagrams of the voltage and current waves of the circuit on opposite sides of the cell, indicating the capacitance effect of the cell.

The change in the electrical properties, specifically its capacitance, of infected milk is revealed by the phase shift between the voltage and current signals of alternating current passing through the milk. As illustrated in FIG. 2, the voltage signal 10 and current signal 11 are in phase before passing through a cell 2, as shown by the signal diagrams to the left of the cell 2, and out of phase after passing through the cell 2 as a result of the cell's capacitance effect, as shown in the signal diagram to the right of the cell 2. Accordingly, this same shift occurs in milk containing a variety of kinds of cells. The amount or degree of this phase shift varies depending upon the capacitance of the milk, and, as described above, the capacitance of the milk is affected by the presence of infection and the resulting changes in the composition of the components in milk.

Figure 3:
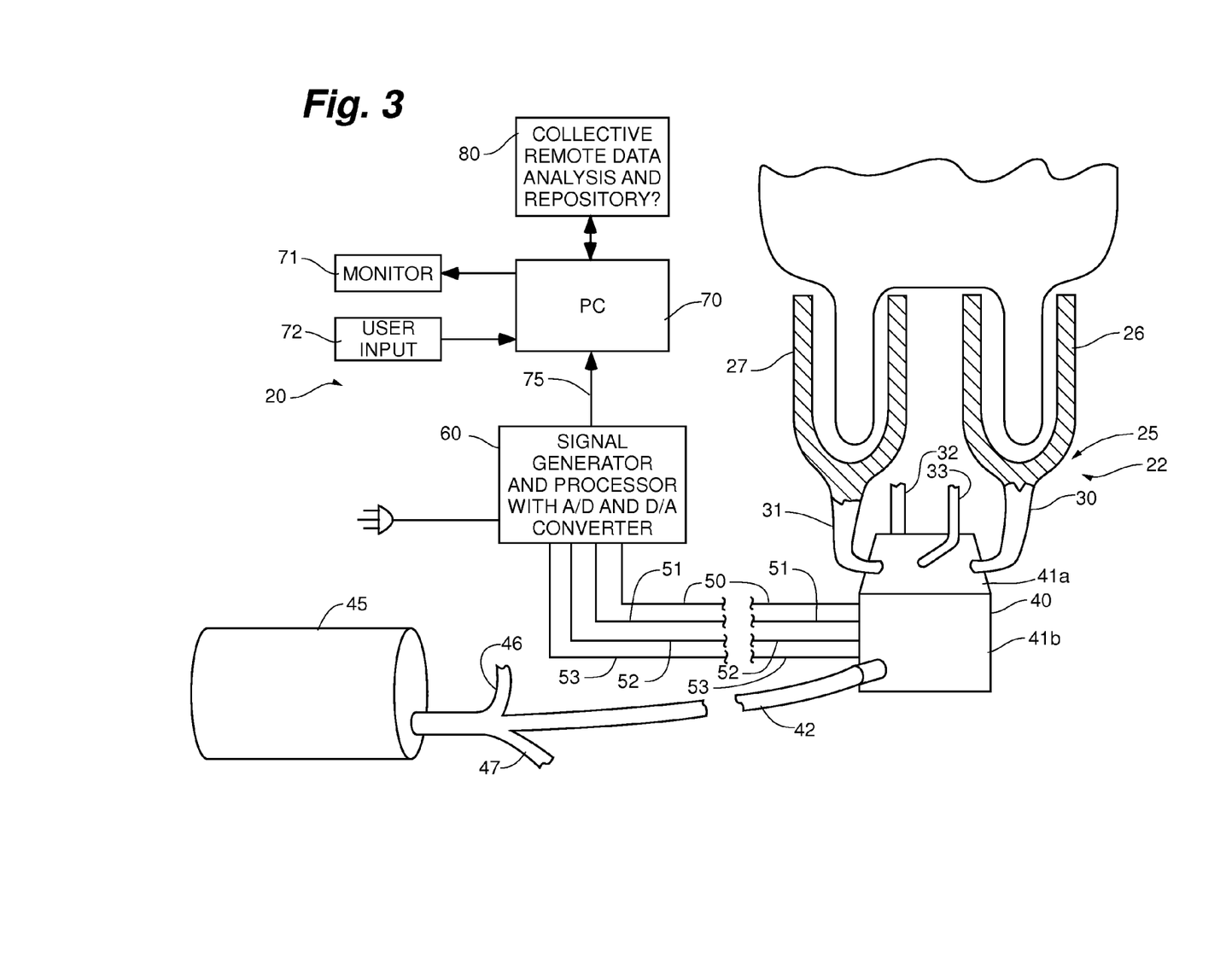
FIG. 3 schematic diagram of a system, device and method for non-invasively diagnosing mastitis by sensing capacitance effect of milk, with portions shown in cross-section and with some elements shown truncated.

A system 20 for testing the capacitance of milk from a dairy cow is depicted schematically in FIG. 3 in conjunction with conventional milking equipment 22. The system 20 is incorporated with typically milking equipment that includes a claw 25 with four teat cups, typified by teat cups 26 and 27. The teat cups 26 and 27 are depicted in position as they engage a cow's teats for milking. Each teat cup 26, 27 is in fluid communication with associated teat lines 30, 31, 32, 33. The teat lines 30-33, in turn, empty into a collection cup 40. The collection cup 40 will be described in greater detail below. The collection cup 40 empties into a collection line 42 that carries milk to a bulk tank 45, with collection lines, typified by lines 46 and 47, from other claws within the milking facility similarly flowing to the bulk tank 45. These features (teat cups, teat lines, collection cups, collection lines and bulk tanks) are part of typical milking equipment 22, though the collection cup 40, having top 41a and bottom 41b portions, used in conjunction with the capacitance testing system 20 may differ in ways described below.

The testing system 20 incorporates probes (not shown in FIG. 3) in contact with milk in the system. The probes may be positioned in any number of places: within the teat cups, within the teat lines, within the collection cup, or within the collection lines. There are advantages to placing the probe in a position upstream from the point where the milk from more than one cow becomes mixed, so that data collected indicates the health of a particular cow. Further, there are advantages to positioning the probe upstream of the collection line 42 so that milk can be assessed by quarter of the milking cow. When milk is tested by quarter, it is possible to compare results from one quarter to another to reveal that one quarter is delivering milk that differs from the milk in the other quarters, suggesting early stages of a disease, such as mastitis, that may spread to other quarters. This facilitates early detection of a disease condition.

In the embodiment illustrated in FIG. 3, the probes are placed within the collection cup 40, as will be described below. The probes are connected via electrically conductive wires 50, 51, 52, 53 to a signal generator/processor and an analog/digital and digital/analog converter 60, such that an electrical circuit is formed through the milk to be tested. This signal generator 60 delivers current at a given frequency to the probes during operation. This generator/processor 60 (or a separate unit) observes the sine wave signals reflecting current and voltage in the circuit upstream (electrically speaking) of the milk and below. As noted above, a shift in phase of these signals results from the capacitive effects of the milk. This will be described in more detail below.

The signal generator/processor 60 (or a separate unit) converts the analog sine wave signal of the current and voltage to digital information that is passed to a computer or CPU 70 to which the generator is coupled for data transmission therebetween. The computer 70 is coupled to one or more displays or monitors 71 and to one or more user input devices 72. In the field, this computer 70 may be conveniently located somewhat remotely, such as in an office, within the milking facility. The connection 75 between the signal generator 60 and the computer 70 may be hardwired or may be wireless. The computer 70 may include data processing capabilities and data storage and may be equipped with software that provides for the collection and management of the data collected from at the facility.

The computer 70 may be connected (such as via the internet) for data delivery to a remote data repository 80 where data from more than one milking facility can be monitored and amassed and from which updated software can be delivered to the computers 70 in the field.

Figure 4A:
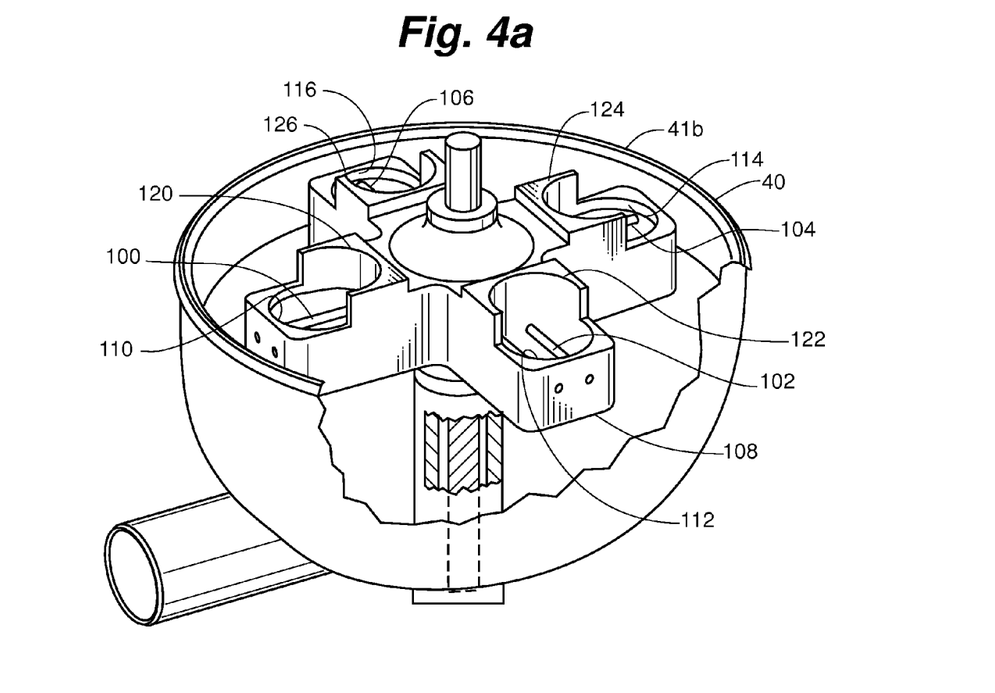
FIG. 4a is a perspective view of a collection cup for use in the system and device of FIG. 3, with portions shown cut away, and some portions shown in cross-section.
Figure 4B:
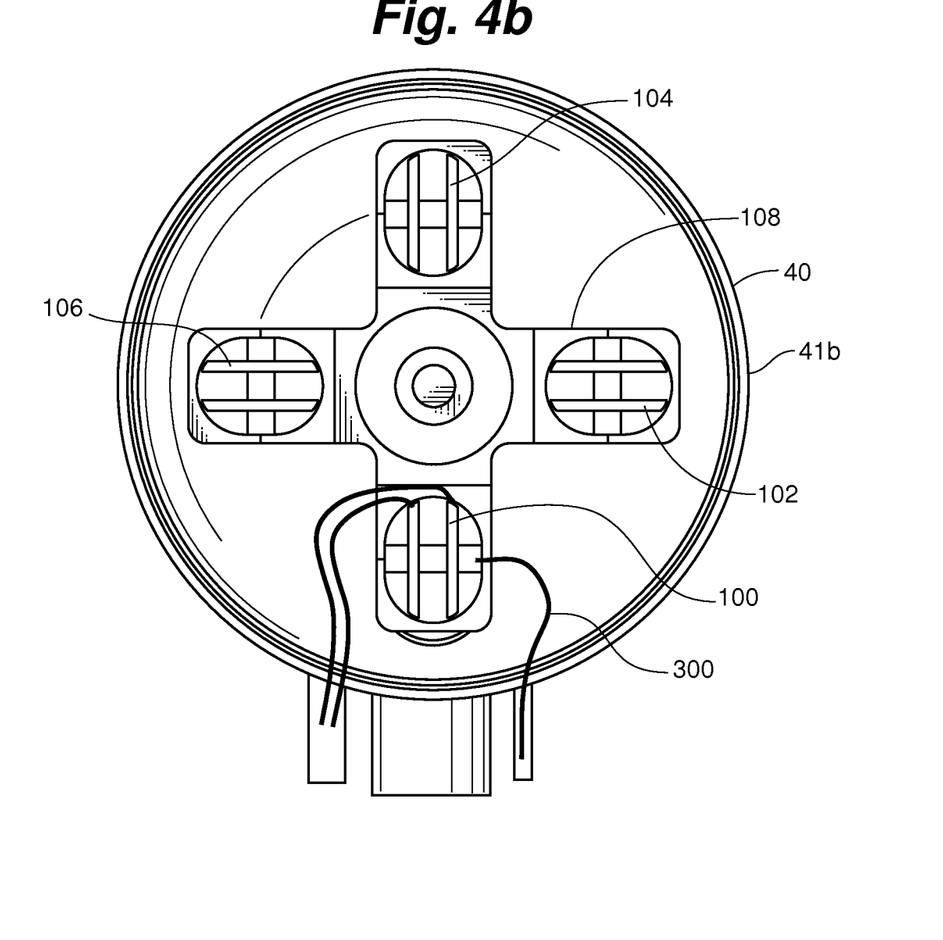
FIG. 4b is a top view of the cup of FIG. 4a, with electrical connections shown schematically.
Figure 4C:
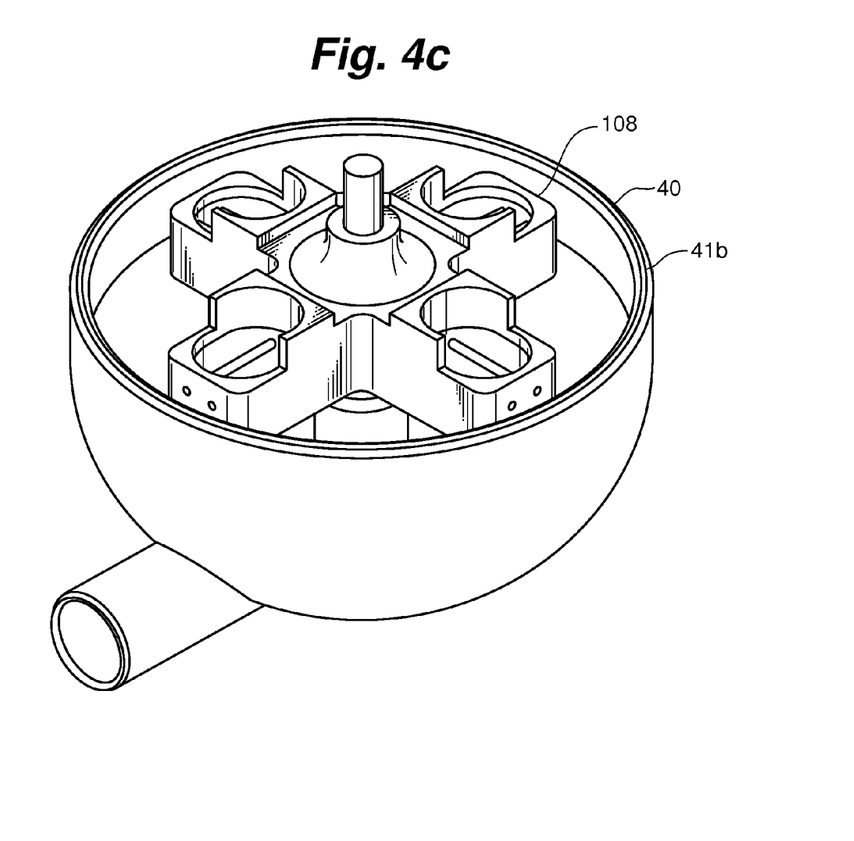

FIG. 4a shows the interior of the bottom portion 41b of one embodiment of a collection cup 40 incorporating probes 100, 102, 104, 106 for delivering current and sensing capacitance of the milk. FIGS. 4b and 4c shows photographs of the embodiment of a collection cup bottom portion 41b illustrated in FIG. 4a.

As shown in FIG. 4a, the four probes are positioned within the cup 40 such that each is exposed to the milk entering the cup 40 from a single teat line; thus, each probe is in contact with and is testing the milk from a single quarter. In this embodiment, a cross- or plus-shaped member 108 is molded of plastic, with cup-shaped bowls 110, 112, 114, 116 molded therein for receiving incoming milk (that it holds only momentarily as milk flows into the bottom portion 41b from the top portion 41a which in turn is connected to teat lines, not shown in FIG. 4a). The bowls 110, 112, 114, 116 may include, backsplashes 120, 122, 124, 126 at the radially innermost edge of each bowl 110, 112, 114, 116 to aid in preventing milk from one quarter mixing with that of other quarters. The member 108 may be suspended or supported within the cup 40 in any suitable manner. As illustrated, the member 108 has a center aperture that fits on the central shaft of a typical collection cup, with the central shaft accommodating a bolt or screw fitting by which the bottom portion of the collection cup is coupled to the top portion. The member 108 may be molded integrally with the bottom portion 41b of the collection cup 40 or may be a separate piece installed on a previously formed cup.

Figure 5A:
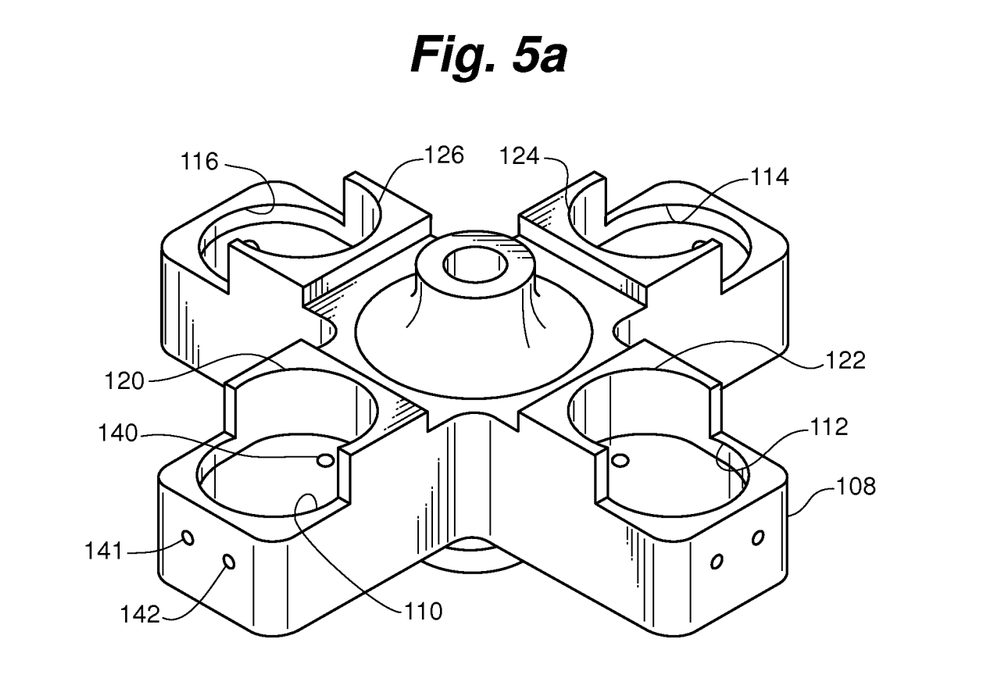
Figure 5B:
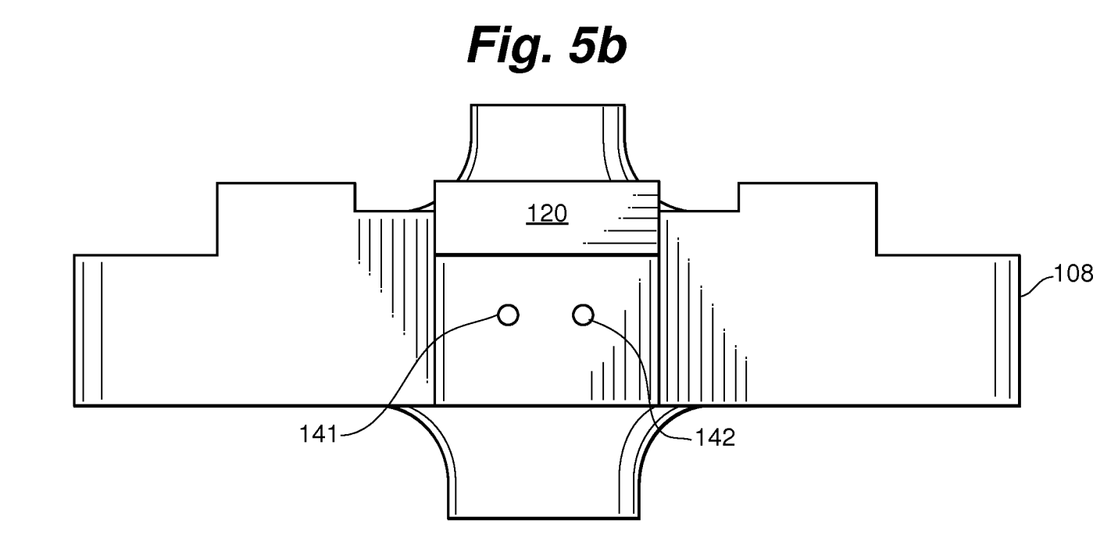

The member 108 is further illustrated, separate from the cup, in FIGS. 5a (perspective view) and 5b (side view). The member 108 defines recesses, such as those typified by recesses 140, 141, 142 for receiving ends of the electrically conductive prongs or electrodes 130, 131. Member 108 is electrically non-conductive.

Installed or embedded within each bowl 110, 112, 114, 116 are the probes 100, 102, 104, 106. Each probe includes one pair of electrically conductive prongs, typified by prongs 130, 131 in bowl 110 that form probe 100. The illustrated prongs 130, 131 are cylindrical and spaced apart. Other probe geometries may be employed and will be discussed below. The prongs 130, 131 are connected by wires to the signal generator 60. These wires are not depicted in FIG. 4a, but are depicted schematically in FIG. 4b. Other options for placing and routing the wires includes passing them through the center post or shaft of the cup.

In an alternative embodiment of a bottom portion of a collection cup, the probes are embedded in the bottom portion of the cup, within or integral with the lower wall of the cup, such that a probe-carrying member such as member 108 in the FIG. 4 embodiment, is not required. To keep the milk separate until it is probed, the bottom portion 141b includes partitions that extend from the top portion to the base on the cup.

According to a method of interrogating milk to determine if it is mastitic, the signal generator/processor sends an electrical circuit through the milk to be tested, via electrically conductive wires 50, 51, 52, 53 that are coupled to probes 100, 102, 103, 104 which are exposed to milk during milking. This signal generator 60 delivers current at a desired frequency (discussed further below) to the probes during operation. This generator/processor 60 (or a separate unit) observes the sine wave signals reflecting current and voltage in the circuit upstream (electrically speaking) of the milk and below. As noted above, a shift in phase of these signals results from the capacitive effects of the milk. The signal generator/processor 60 (or a separate unit) converts the analog sine wave signal of the current and voltage to digital information that is passed to the computer or CPU 70 to which the generator is coupled for data transmission there between.

Figure 6:
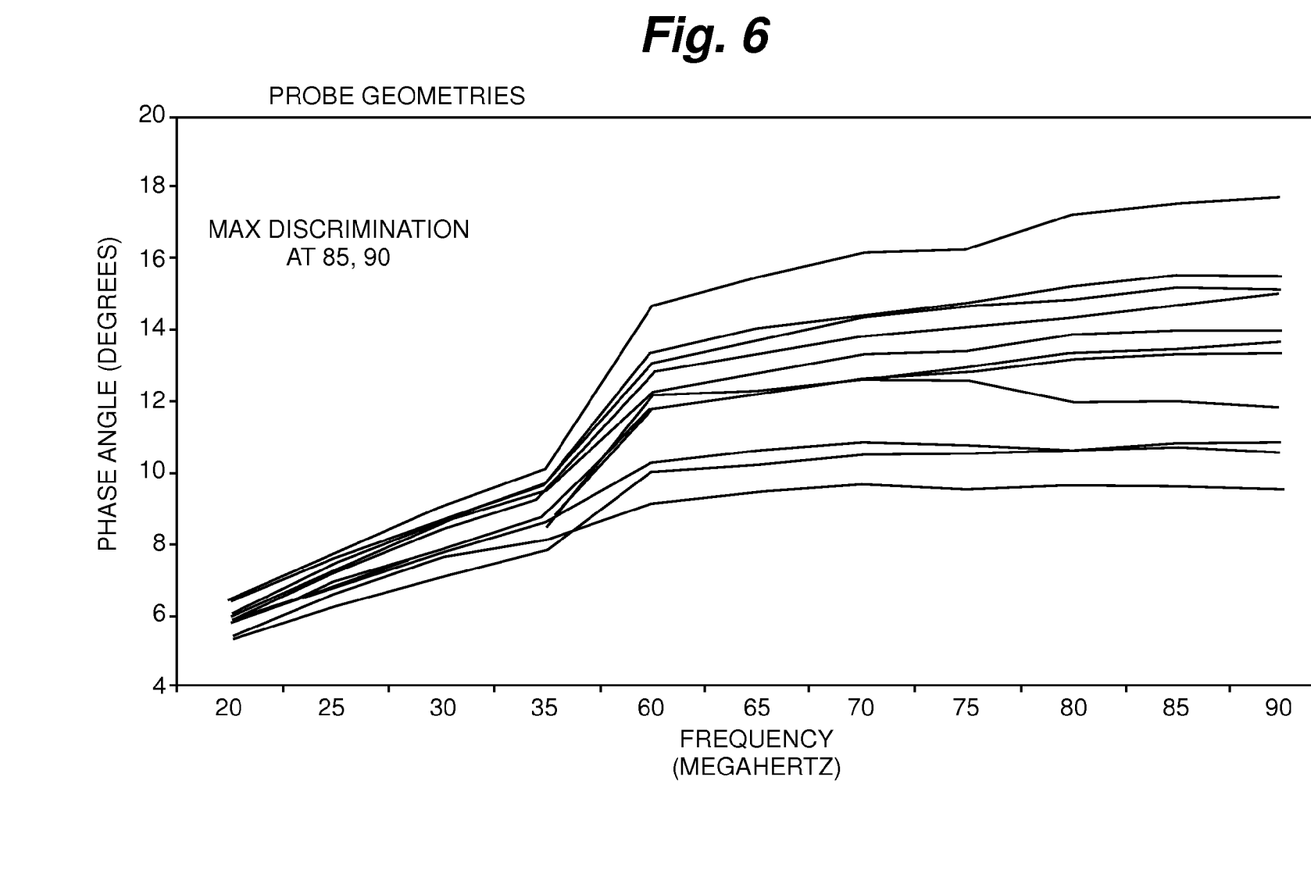
FIG. 6 is a graph showing experimental results plotting phase angle in degrees as a function of frequency, with data taken at eleven frequencies with probes of 12 geometries using the capacitance probe illustrated in FIGS. 4a-c.

FIG. 6 shows a graph depicting results from experimentation on a variety of probe geometries across a range of frequencies. The graph displays phase angle (in degrees) as a function of frequency (in megahertz). All probes consisted of parallel, spaced apart, cylindrical bars, with variations made in the depth of the prongs within the bowl, the diameter of the bars and the spacing of the bars from one another. Using milk from a cow known to have mastitis, phase angle measurements of the milk were made during milking using the collection cup configuration shown in FIGS. 4b and 4c, at 11 predetermined frequencies, using probes with the 12 different geometries. The frequencies ranged from 20 to 35 and 60-90 megahertz, at intervals of 5 megahertz. The greatest phase shift occurred with geometry 1, though all geometries produced workable results. The results, as depicted in the graph of FIG. 6, show that at frequencies lower than 35 megahertz, only a fairly small phase shift (on the order of less than 10 degrees is observed. At frequencies of 60 megahertz and above, a more significant phase angle shift is observed. Further, it is demonstrated that the phase angle shift is roughly uniform (or slightly increasing or decreasing) for frequencies above 60 megahertz through 90 megahertz. Within the range of frequencies that yield a reliably discernable phase angle, it is best to use a frequency safely higher than 60 megahertz, since frequency within the system may fluctuate a bit, and such a "wander" towards a lower frequency might result in moving into the frequency below 60 megahertz that does not yield a reliable discernable phase angle.

Thus, based on these findings, the optimal frequency for use in detecting phase angle shift to identify mastitic milk is greater than 60 megahertz, and in a preferred method is greater than 65 megahertz to minimize the danger of poor results that may be caused if frequency "wanders" below the selected frequency.

Additional Anatomical Parameters

To increase accuracy of the system, and to reduce the occurrence of false positive results, the system may interrogate for other anatomical targets on the same milk. Preferably such other targets are sensed by the quarter and in real-time or near real-time during milking. Further, such other data sensing and collection is coordinated with an identification system and the collected data is associated with the capacitance data taken for a given cow. For example:

Temperature: Temperature can be measured by placing a thermocouple or other temperature sensor within the system 20, such as in the teat cup, the collection cup, or along any of the milking lines or conduits. Most preferably, the temperature sensors are deployed in a position to take temperature for the milk coming from a single teat. For example, the temperature sensor is positioned within the collection cup 40. As illustrated in FIG. 4b, a thermocouple 300 can be located such that its exposed tip terminates within the bowl 110. Similar thermocouples can be positioned within each of the bowls 110, 112, 114, 116, though only exemplary thermocouple 300 in blow 110 is depicted in FIG. 4b.

Because a thermocouple is made of metal, it can act as an antenna and interfere with a capacitance probe. The geometry and positioning of the embodiment shown in FIG. 4b yields minimal interference.

A microbulometer is an alternative or additional technology for collecting temperature data. The microbulometer maps temperature measurement on a surface to spatial locations and yields digital data that can conveniently be stored or processed. For example, a microbulometer might be used to observe one side of a cow's udder and temperature readings of the surface of the udder would be determined. A mastitic infection causes inflammation that raises the temperature of the surface of the udder so a hot area (particularly where one teat is hotter than another) would be apparent.

pH: In the presence of a mastitis infection, the acidity of milk is increased. Thus, technologies for measuring pH can be incorporated to detect mastitis.

Volumetric flow: Volume production is lowered in the presence of a mastitic infection. Therefore sensors measuring volumetric flow of milk may be added.

Energy response (NIR, Ultrasound, laser): Because the composition of milk changes in the presence of mastitis, the spectral response (via reflection or absorption) of milk to light, sound or energy (including near infrared, laser and ultrasound) changes as well. These changes can be measured and detected and coupled with phase shift information.

Chip/assay: Diagnostic chips or assays that recognize disease can be incorporated.

Although the determination of the presence of mastitis may involve both phase angle measurements and other unrelated data parameters. Experiment has shown that good performance in terms of the declaration of false positives and false negatives can be achieved by comparing each quarter with companion quarters on the cow. It appears that the difference in phase angle measurement at the specified frequency differs significantly between quarters in a single cow in the early stages of the disease. It is surmised that this is due in part to the fact that we are not measuring somatic cell count explicitly or solely. If effect we are making a multiparameter measurement encompassing multiple changes unique to a sub clinical case of mastitis.

Figure 7:
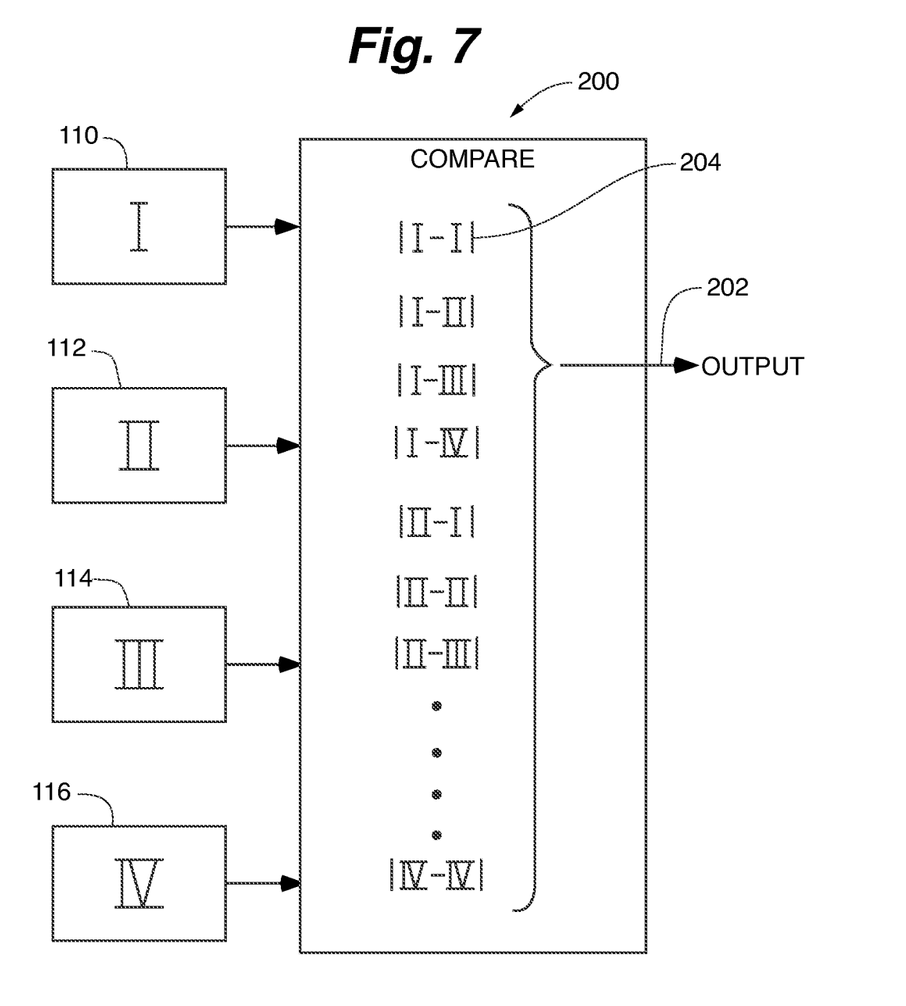
FIG. 7 is a chart showing a method of comparing data.

FIG. 7 shows a simplified measurement system based on this principle. These processes are intended to be carried out by the PC computer system 70 of FIG. 3 or they may be carried out by dedicated hardware implemented and integrated in the signal generator system seen as 60 in FIG. 3.

In FIG. 7 the four quarters of a cow's udder are represented as quadrants I, II, III, IV corresponding to the measurement cups 110, 112, 114, 116 respectively. The separate phase angle measurements for each teat are collected in near real time from the several quarters and these can be compared with each other sequentially as suggested by the array of absolute value calculations typified by absolute value 204 in FIG. 7. This process may be implemented in either hardware or software. And either process is intended to be indicated by the comparator function 200. In essence the largest difference between quarters is taken as a measure of sub clinical mastitis. If this difference exceeds a threshold amount the process will generate an appropriate alarm or declaration of the potential presence of disease. Typically the milk would be diverted from collection and tested for pathogens at this point. Normally the largest difference detected by the comparator 200 will trigger an output a declaration or alarm 202 indicating an ill cow. However there is some flexibility to this process. For example in one embodiment each teat is compared to the average measurement of the other three teats. In this process small variations between teats are averaged out. Although it is desirable to take phase angle measurements for each teat at nearly the same time a multiplexer can be used to essentially share the measurement system between the several probes. The multiplexer can operate as a switch to couple each teat probe sequentially so that the same oscillator and phase angle system is used with each probe improving measurement performance and reducing complexity and cost. The important feature is the comparison of one probe measurement with the companion probes. This may be done individually or it may be done in an ensemble or average fashion.

With respect to probe geometry, experiments have shown that the parallel rods immersed in the milk cup works well for the phase angle measurement. In this context the fact that the milk cups overflow providing a serial dilution of milk may be important as well. In addition the presence of the backsplash performs as a baffle to isolate the milk cups.

Animal Identification

For optimal usefulness, the system and method for analyzing milk requires that the collected data be accurately and reliably matched to the appropriate cow. Radio frequency identification tags attached to cows ears have been used in the dairy industry. Typically, with such systems, the tag readers are located a short distance from the positions at which the cows are milked. This leads to errors in matching data to cows because cows may maneuver out of order as they traverse the distance between the reader and the milking device or data collection location.

To achieve more accurate matching of the milk data to its cow, an identification system is located in the immediate vicinity of the milking equipment. For example, an RF identification tag is implanted in the vicinity of the cows' udders and the milking claw contains an RF interrogator.

Milking Facilities

Milking facilities are generally of two types: robotic and non-robotic. In robotic systems, cows choose when they desire to be milked and go to a milking station where milking equipment attaches to their teats via robotic mechanisms. In a robotic system, the cow is milked with little or no interaction with a human. In such settings, a system for detecting mastitis automatically, in the course of milking, is particularly advantageous, since the opportunity for human observation is limited, making it more likely that mastitis will not be observed until it is severe. Therefore, the capacitance testing system described herein to detect mastitis early and reliably is particularly useful.

Although an illustrative version of the device is shown, it should be clear that many modifications to the device may be made without departing from the scope of the invention.

I claim:

1. A milking apparatus, comprising:
   a) a milking claw having teat cups, each teat cup in fluid communication with a cup conduit;
   b) claw conduit in fluid communication with said cup conduits;
   c) multiple electrical probes positioned to contact milk as it flows through the apparatus during milking, with one probe per teat;
   d) generator circuits for supplying AC current to each of said probes at a frequency of greater than 60 megahertz;
   e) phase monitoring circuits for measuring the shift in the phase angle of the signal while AC current is applied to said probe that results from the presence of the milk in each probe;
   f) comparison circuits for comparing the phase angle measurement of any one probe with complementary companion probes, concurrently and forming an ensemble average of the measurements from all four teat cups from measures made at substantially the same time, and taking the absolute value of the comparison between each teat cup and the average and triggering an alarm if the measure exceeds a threshold.

2. A milking apparatus according to claim 1, wherein said probe comprises two spaced-apart electrodes exposed directly to milk.

3. A milking apparatus according to claim 2, wherein said electrodes are cylindrical and parallel to each other.

4. A method according to claim 1, wherein said frequency is greater than 65 megahertz.

5. A method according to claim 1, wherein said step of delivering current is conducted during milking of a cow.

* * * * *